United States Patent Office 3,335,142
Patented Aug. 8, 1967

3,335,142
PROCESS FOR THE PREPARATION OF
N,N'-DISUBSTITUTED UREAS
William Baptist Hardy, Bound Brook, and Robert Putnam
Bennett, Bridgewater Township, Somerset County, N.J.,
assignors to American Cyanamid Company, Stamford,
Conn., a corporation of Maine
No Drawing. Filed July 7, 1965, Ser. No. 470,213
4 Claims. (Cl. 260—256.4)

This invention relates to a process for making urea compounds. More particularly, it relates to the preparation of aromatically N,N'-disubstituted ureas by reacting aromatic nitro compounds with carbon monoxide and water at elevated temperature and pressure in the presence of a suitable catalyst.

Aromatically substituted ureas, such as carbanilide and its derivatives, have many uses including use as chemical intermediates (e.g., with formaldehyde resins are formed), insecticides, herbicides, bactericides, mothproofing agents, therapeutic agents, curing agents for epoxy resins, antioxidants and stabilizers for rubber and other polymers, etc. Heretofore, they have been made by various methods, including reactions of (1) amines and phosgene, (2) amines and isocyanates, (3) amines and urea, etc. The amines are normally prepared by the reduction of the corresponding nitro compounds. It is reported in Chem. Rev., 62, 283 (1962), that the reaction of nitrobenzene with carbon monoxide and hydrogen in the presence of dicobalt octacarbonyl gave carbanilide. Carbanilides have also been obtained by treating amines with carbon dioxide under conditions of elevated pressure and temperature.

It has now been discovered that N,N'-diaromatically substituted ureas, such as the carbanilides, can be prepared directly from nitro compounds in a one-step process by reacting aromatic nitro compounds with carbon monoxide and water under conditions of elevated temperature and pressure in the presence of a catalytic quantity of a Lewis acid and a noble metal.

The reaction can be represented as follows:

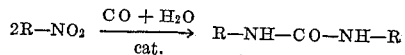

$$2R-NO_2 \xrightarrow[\text{cat.}]{CO + H_2O} R-NH-CO-NH-R$$

wherein R is an aromatic radical such as phenyl, naphthyl, pyridyl, pyrimidyl, furyl, thienyl, etc.

The reaction between the nitro compound and carbon monoxide may be carried out in an autoclave or any other high pressure reactor. A simple procedure is to charge the nitro compound, at least 0.5 mole of water per mole of nitro groups, and catalyst in a solvent, if one is employed, into the reaction vessel, introduce the proper amount of carbon monoxide, and then heat the mixture to obtain the desired reaction pressure. The reaction can be conducted as a continuous operation, or batchwise. Of course, the order of addition of the reactants may be varied to suit the particular apparatus which is employed. For example, the reactants may be introduced on a continuous basis into the heated reactor while, at the same time, the product is withdrawn. The reaction product is recovered and then treated by conventional procedures to effect separation of carbanilide from unreacted starting material, solvent, by-product, etc.

The present invention provides a generally applicable process for converting either mono- or polynitro derivatives to aromatic N,N'-disubstituted ureas.

Typical of the nitro compounds which can be converted are aromatic derivatives, such as nitrobenzene, o-, m- and p-dinitrobenzene, α- and β-nitronaphthalene, 1,5-, 1,6- and 1,7-dinitronaphthalene, 9-nitroanthracene, 4-nitrobiphenyl, 4,4'-dinitrobiphenyl and 1-nitroanthraquinone. Likewise, heteroaromatic derivatives such as 5-nitropyrimidine, 2-nitrofuran, 2-nitrothiophene, 4-nitropyridine, 2-nitropyrazine, 2-nitroimidazole, and the like.

The process of this invention is applicable to nitro compounds with or without other substituents, such as alkyl, alkenyl, alkoxy, halogen, amido, hydroxy, mercapto, carboxy, cyano, acyl, sulfo, sulfonyl, sulfamyl, carbamyl, phosphono, phosphino and silyl radicals. Among the substituted nitro compounds useful as starting materials herein, are o-, m- and p-nitrotoluene, m-chloronitrobenzene, p-methoxynitrobenzene, 2,4-dinitrotoluene, 2,6-dinitrotoluene, dinitrodiphenylmethane, dinitroditolylmethane, trinitrodiphenylethane, tris(nitrophenyl)methane and tris(nitrotolyl)methane. Substitutents do not, in general, interfere with the carbonylation reaction of this invention. Certain substituents may themselves react with carbon monoxide concurrent with carbonylation, but the latter reaction, nevertheless, occurs. Where a dinitro starting material, such as dinitrobenzene, is used, a carbanilide may be formed from either of the two nitro groups, and if the intermediate nitro carbanilide product is insoluble in the reaction medium, it will percipitate out before the second nitro group is carbonylated. If the intermediate nitrocarbanilide is soluble in the reaction medium, the second nitro group will be carbonylated. One or more nitro compounds may be charged into the reactor.

Reaction conditions can be varied over a wide range provided several requirements with respect to pressure and temperature are met. Pressures within the reactor must be in the range of about 40 p.s.i. to 100,000 p.s.i. The reaction will proceed at temperatures above 60° C., and preferably between 150° C. and the temperature of decomposition of either starting material or product. The optimum residence time will vary inversely with temperature in the reactor. With more reactive starting materials, less stringent conditions may be employed. The particular conditions for a given reactant are easily determined in accordance with the foregoing principles.

It is desirable, but not necessary, that a solvent be employed, since many nitro compounds are solids under reaction conditions. Suitable solvents are anhydrous liquids, in which the nitro compound is soluble or dispersible, e.g., benzene, toluene, xylene, aliphatic halogenated hydrocarbons such as 1,1,2-trichloro-1,2,2-trifluoroethane, halogenated aromatic hydrocarbons such as monochlorobenzene, dichlorobenzene and trichlorobenzene.

The amount of carbon monoxide pumped into the reactor should be sufficient to provide at least three moles of carbon monoxide per nitro group. Preferably, however, a large excess should be employed to give the super-atmospheric pressures required for preferred operation of the present invention.

The catalyst for the reaction of the invention comprises a noble metal and a Lewis acid, as defined in the reference book by Jack Hine, "Physical Organic Chemistry," 1962, McGraw-Hill Book Co., New York. According to the reference, Bronsted acids are included by the term "Lewis acids." The noble metal may be used either in a metallic or a chemically combined state. It may be deployed either with or without a physical support. Among the noble metals which can be employed are platinum, palladium, ruthenium, rhenium, rhodium, osmium, silver, gold, iridium and mercury. Among the chemical forms of these metals which can be used herein are oxides, sulfates, nitrates and halides, as for example: platinum oxide, platinum chloride, platinum nitrate, platinum sulfate and the corresponding palladium compounds.

The Lewis acid component of the catalyst can be a halide (e.g., an iodide, bromide, chloride or fluoride), an acetate, a sulfate, or a phosphate of a metal such as tin, titanium, gallium, iron, aluminum or copper.

As specific examples of Lewis acids one can name ferric chloride, ferrous chloride, stannic chloride, stannous chloride, aluminum chloride, titanium tetrachloride, aluminum bromide, gallium trichloride, and cuprous chloride. Additional examples of the salt type of Lewis acids are listed in the reference book by George A. Olah, "Friedel-Crafts and Related Reactions," volume I, 1963, Int. Publ., New York.

An example of the "Bronsted type" of Lewis acids is anhydrous hydrogen chloride.

Within the group of useful Lewis acids, it is preferred to use strong Lewis acids having a halide anion. Chlorides or iron and aluminum are especially preferred.

The physical form of the catalyst can be varied to suit particular needs. The metals can be self-supported or deposited upon a support which disperses the metals so as to increase active surface area. Such porous supports include alumina, silica, carbon, barium sulfate, calcium carbonate, asbestos, bentonite, diatomaceous earth, fuller's earth, and the like.

It is possible to deposit the noble metal on a support and form the Lewis acid catalyst in situ by conducting the reaction in a vessel which can supply a cation when using a solvent medium which can supply an anion under reaction conditions. For example, if the walls of the reaction vessel contain iron and a halogen-containing solvent, such as 1,1,2-trichloro-1,2,2-trifluoroethane, is used, under reaction conditions the corresponding iron halide will be formed. This fulfills the reaction requirement for a Lewis acid. Similarly, a noble metal and a base metal capable of forming a Lewis acid (e.g., iron or aluminum) may be deposited on a porous support. This base metal, in conjunction with a solvent medium comprising a halogenated solvent (e.g., 1,1,2-trichloro-1,2,2-trifluoroethane or a similar halogenated aliphatic hydrocarbon), forms a Lewis acid under reaction conditions. Other means of forming the Lewis acid in situ will be apparent from these procedures.

A very useful catalytic system consists of 5% palladium supported on alumina and ferric chloride. The catalyst should be used in an effective amount. This amount will be determined by reaction pressure and temperature, purity of the nitro starting material, etc. Once it is known that the desired reaction proceeds in the presence of a noble metal-Lewis acid catalyst, it is within ordinary means to determine how much of each will be used. It has been found that a useful range is in the area of about 0.1 to $10^{-5}$ mole of noble metal and 0.05 to $5 \times 10^{-4}$ mole of Lewis acid per mole of nitro group. Actually, as long as even trace amounts of the metals are present, reaction will proceed. The upper limit of catalyst usage is governed primarily by cost considerations. A preferred catalyst system will have about 0.02–0.001 mole of Lewis acid and 0.05 to 0.005 mole of noble metal per mole of nitro group. Within these areas, the centers of the respective ranges are especially preferred, but the preferred range depends greatly on the equipment and conditions used, i.e., the amount of agitation, concentrations, temperature, pressure, etc.

This invention is illustrated in the following examples, in which percentages are on a weight basis.

EXAMPLE 1

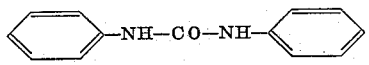

A suitable pressure vessel with stainless steel walls is charged with 90 parts 1,1,2-trichloro-1,2,2-trifluoroethane, 12.3 parts (0.1 mole) nitrobenzene, 0.9 part (0.05 mole) water and 5 parts 5% palladium on alumina. The pressure vessel is sealed and flushed three times with carbon monoxide. Carbon monoxide is introduced into the autoclave until a pressure of 8,500 p.s.i. is obtained. With agitation, the pressure vessel is heated to 170° C. The internal pressure is then about 13,000 p.s.i. After maintaining the temperature at 170° C. for five hours, the pressure vessel is cooled to room temperature, vented, flushed with nitrogen and opened. The solvent-soluble material is removed, and the pressure vessel is rinsed with a solvent for the carbanilide. The combined solvents are filtered, and the solvent is removed from the product by distillation under reduced pressure. The crude product is recrystallized from a suitable solvent to give carbanilide.

In a similar procedure using benzene as the solvent and adding 0.73 mole of ferric chloride, carbanilide is also produced.

EXAMPLE 2

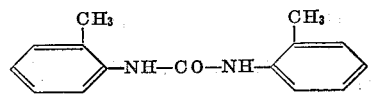

The general procedure of Example 1 is repeated, substituting an equivalent amount of o-nitrotoluene for the nitrobenzene and using a temperature of 180° C. and pressure of 11,000 p.s.i. The product is 2,2'-dimethylcarbanilide.

EXAMPLE 3

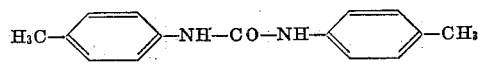

The general procedure of Example 1 is repeated, substituting an equivalent amount of p-nitrotoluene for the nitrobenzene and a pressure of 13,800 p.s.i. The product is 4,4'-dimethylcarbanilide.

EXAMPLE 4

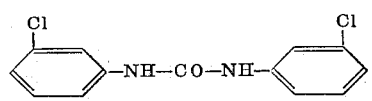

The procedure of Example 1 is repeated, substituting an equivalent amount of m-chloronitrobenzene for the nitrobenzene and using a pressure of 13,000 p.s.i. The product contains 3,3'-dichlorocarbanilide.

EXAMPLE 5

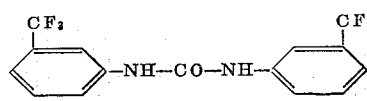

The general procedure of Example 1 is repeated, substituting an equivalent amount of m-nitrotrifluoromethylbenzene for the nitrobenzene and using a pressure of 14,750 p.s.i. The product is 3,3'-bis(trifluoromethyl)carbanilide.

EXAMPLES 6–7

A series of reactions is carried out by the general procedure of Example 1, varying the pressure present during the heating.

| Example: | Pressure (p.s.i.) |
|---|---|
| 6 | 1,800 |
| 7 | 5,300 |

The product in each example is carbanilide.

EXAMPLES 8–14

The general procedure of Example 1 is repeated, using the catalyst, temperature and pressure shown below. The product in each example is carbanilide.

| Example | Catalyst | Temp. (° C.) | Pressure (p.s.i.) |
|---|---|---|---|
| 8 | 5% Pd/BaSO$_4$ | 170 | 10,500 |
| 9 | 5% Pd/CaCO$_3$ | 180 | 13,500 |
| 10 | 5% Rh/alumina | 180 | 11,500 |
| 11 | 5% Ru/alumina | 170 | 11,500 |
| 12 | Pd black | 170 | 14,500 |
| 13 | PtO$_2$ | 170 | 4,100 |
| 14 | PdCl$_2$ | 170 | 4,100 |

EXAMPLE 15

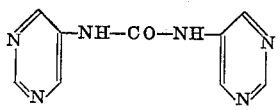

The general procedure of Example 1 is repeated, substituting an equivalent amount of 5-nitropyrimidine for the nitrobenzene and using a pressure of 14,400 p.s.i. The product is N,N'-di-5-pyrimidinylurea.

EXAMPLE 16

*Preparation of palladium-ferric chloride catalyst*

A 5% palladium-on-alumina catalyst is treated with an ether solution of ferric chloride. The ether is evaporated from the resulting slurry, and the catalyst is dried by heating in a stream of carbon monoxide. The catalyst contains 3% iron.

We claim:

1. A process of preparing aromatic and heteroaromatic N,N'-disubstituted ureas which comprises reacting, at pressures within the range of 40 to 100,000 pounds per square inch and temperatures between 60° C. and the temperature of decomposition and in the presence of an effective amount of a catalyst consisting essentially of a noble metal and a Lewis acid, carbon monoxide, water and an aromatic or heteroaromatic nitro compound, said reaction being conducted under conditions of super-atmospheric pressure at an elevated temperature below that at which the starting materials and the product urea decompose.

2. The process of claim 1 wherein the noble metal is dispersed on a porous support and the Lewis acid is a member selected from the group consisting of the halides of iron, aluminum, tin, titanium and gallium.

3. A process of preparing aromatic and heteroaromatic N,N'-disubstituted ureas which comprises, in the presence of an effective amount of catalyst consisting essentially of a noble metal and a Lewis acid, reacting carbon monoxide, water and an aromatic or heteroaromatic nitro compound, said reaction being conducted under a pressure of at least 2,000 p.s.i. and at an elevated temperature above 60° C. and below that at which the starting materials and the product urea decompose.

4. A process of preparing aromatic and heteroaromatic N,N'-disubstituted ureas which comprises, in the presence of an effective amount of a Lewis acid-noble metal catalyst, reacting carbon monoxide, water and an aromatic or heteroaromatic nitro compound, said reaction being conducted under conditions of super-atmospheric pressure within the range of 40 to 100,000 pounds per square inch and at a temperature of at least 150° C.

No references cited.

ALEX MAZEL, *Primary Examiner.*

NICHOLAS S. RIZZO, *Examiner.*

MARY U. O'BRIEN, *Assistant Examiner.*